United States Patent
Sugie

Patent Number: 5,728,632
Date of Patent: Mar. 17, 1998

[54] LIGHT INTERCEPTING NET

[76] Inventor: Ryoichi Sugie, 5-1, Uchihiranomachi 1-chome, Chuoku, Osaka, Japan

[21] Appl. No.: 385,396

[22] Filed: Feb. 7, 1995

Related U.S. Application Data

[63] Continuation of Ser. No. 189,947, Jan. 31, 1994, abandoned, which is a continuation of Ser. No. 918,154, Jul. 21, 1992, abandoned, which is a continuation of Ser. No. 507,110, Apr. 9, 1990, abandoned, which is a continuation of Ser. No. 326,943, Mar. 22, 1989, abandoned.

[30] Foreign Application Priority Data

Mar. 24, 1988 [JP] Japan ................... 63-71551

[51] Int. Cl.$^6$ ................... B32B 7/00; B60J 3/00
[52] U.S. Cl. ................... 442/43; 442/2; 442/3; 442/45; 442/46; 428/38; 428/343; 428/918; 296/97.1; 296/97.2; 296/97.3; 296/152; 160/370.21; 160/DIG. 2; 160/DIG. 3; 160/DIG. 7
[58] Field of Search ................... 428/245, 253, 428/255, 265, 268, 343, 38, 261, 918, 273; 296/97.1, 97.2, 97.3, 152; 160/370.21, DIG. 2, DIG. 3, DIG. 7; 442/2, 3, 43, 46, 45

[56] References Cited

U.S. PATENT DOCUMENTS

| | | | |
|---|---|---|---|
| 1,497,989 | 6/1924 | Russell | 428/918 |
| 1,717,738 | 6/1929 | Schwarz | 40/564 |
| 2,381,542 | 8/1945 | Hyatt et al. | 428/268 |
| 2,854,352 | 9/1958 | Gronemeyer | 428/261 |
| 2,931,117 | 4/1960 | Bosworth et al. | 40/615 |
| 3,032,438 | 5/1962 | Gaynes et al. | 428/261 |
| 3,042,561 | 7/1962 | Iwashita | 428/918 |
| 3,166,116 | 1/1965 | Cole, Jr. | 160/370.21 |
| 3,391,050 | 7/1968 | Nebessar | 428/343 |
| 3,451,877 | 6/1969 | Herschman | 428/38 |
| 3,511,365 | 5/1970 | Dow | 428/31 |
| 3,753,458 | 8/1973 | Lazarek | 160/354 |
| 4,353,593 | 10/1982 | Henson | 160/DIG. 2 |
| 4,358,488 | 11/1982 | Dunklin et al. | 428/31 |
| 4,547,406 | 10/1985 | Armstrong | 427/282 |
| 4,562,675 | 1/1986 | Baigas, Jr. et al. | 160/DIG. 7 |
| 4,940,622 | 7/1990 | Leavitt, Sr. et al. | 428/31 |
| 5,423,589 | 6/1995 | Pank | 160/370.21 |
| 5,489,136 | 2/1996 | Pank | 296/146.15 |

FOREIGN PATENT DOCUMENTS

| | | |
|---|---|---|
| 1502610 | 11/1967 | France . |
| 51-86049 | 6/1976 | Japan . |
| 2178765 | 2/1987 | United Kingdom . |

OTHER PUBLICATIONS

"American Scenics" catalogue, 1979.
"Screen Acts Like a Mirror"; Arizona Republic; 10-E, Mar. 8, 1968.
"Shadow Screens" catalogue, 1979.
"Gila" catalogue, No Date.

*Primary Examiner*—Terrel Morris
*Attorney, Agent, or Firm*—Jordan and Hamburg

[57] ABSTRACT

The light intercepting net in accordance with the present invention has fine meshes and is formed by weaving or knitting yarns, a tackiness may be applied to the net at one side thereof. The one side of the net to which the tackiness agent is applied is preferably flat or smoothed.

Preferably, the net is formed by weaving or knitting glass fiber yarns and then coated with resin, and yarns constituting the net have a suitable stretchability and elasticity.

Colors or patterns may be painted or drawn on the net at one side or both sides thereof.

The tackiness agent is preferably hydrophilic.

3 Claims, 4 Drawing Sheets

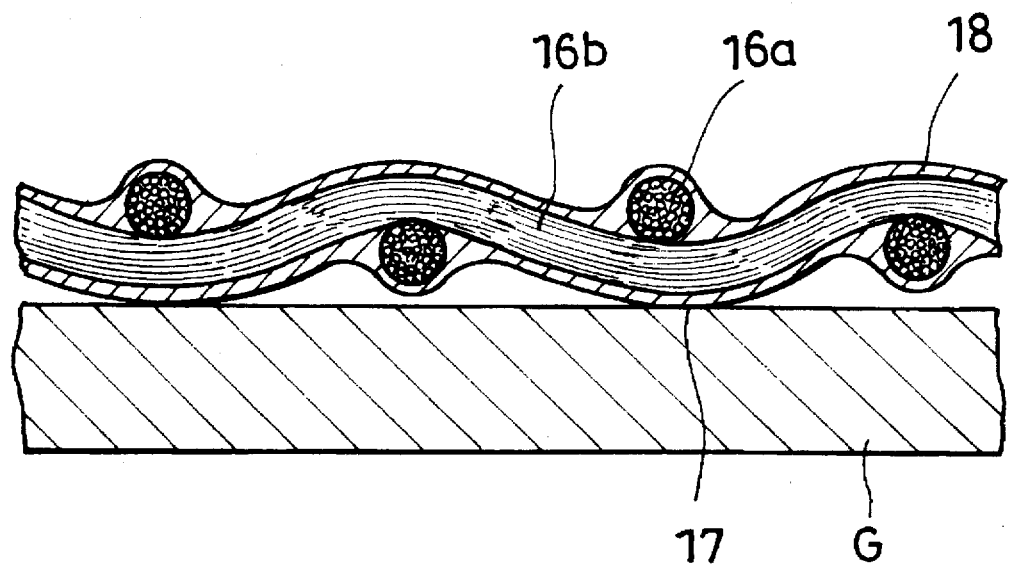
F I G. 2
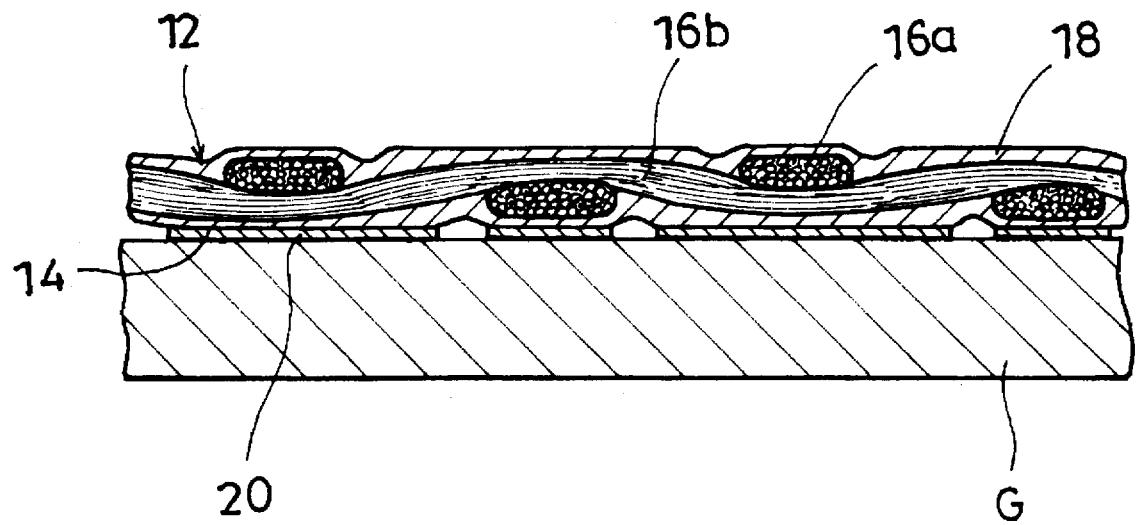
F I G. 3

LIGHT INTERCEPTING NET

This application is a continuation, of application Ser. No. 08/189,947 filed Jan. 31, 1994, now abandoned, which, in turn, is a continuation of application Ser. No. 07/918,154 filed Jul. 21, 1992, now abandoned, which, in turn, is a continuation of application Ser. No. 07/507,110 filed Apr. 9, 1990, now abandoned, which, in turn, is a continuation of application Ser. No. 07/326,943, filed Mar. 22, 1989, now abandoned.

BACKGROUND OF THE INVENTION

The present invention relates to a light intercepting net to be attached onto the window surfaces or the like of a building or the like, which is capable of reducing the amount of rays of light entering the inside from being seen into from the outside, yet assuring to see through the outside from the inside.

There are known articles of the type to be attached onto the window surfaces of a building or the like for reducing the amount of rays of incident light and preventing the building inside from being seen into from the outside. Such conventional articles are largely grouped into three types, i.e., a paper type, an embossed type and a semi-transparent film type. All of them are made in the form of a sheet.

In the paper-type sheet, there are utilized the opacity of the material itself and the nature thereof to cause the rays of light incident on paper to be diffusely reflected. In the embossed-type sheet similar to stained glass, there is utilized its nature to provoke diffused reflection and color absorption. The sheets of both types are satisfactory in view of reduction in the amount of incident light and prevention of the inside from being seen through from the outside. However, these sheets present the problem to prevent the outside from being seen through from the inside.

A sheet of the semitransparent film type is made of a film having a good see-through efficiency, and a light reflecting agent or a color absorbent mixed therewith. Such sheet is capable of achieving the functions above-mentioned. However, this sheet gives an indefinable feeling of disorder due to the mixed agent or absorbent, thus assuring no fine see-through.

Further, all the sheets above-mentioned commonly present a serious problem of difficult attachment thereof onto the window surface of a building or the like. For a curved window surface, it is hardly possible to attach any of such conventional sheets.

SUMMARY OF THE INVENTION

The present invention is proposed to overcome the problems above-mentioned with addition of new features.

It is an object of the present invention to provide a light intercepting net:

(A) which is capable of reducing the amount of the incident light, and preventing the inside from being seen into from the outside, yet assuring a fine see-through of the outside from the inside:

(B) which can be readily attached not only on a flat surface but also on a curved surface;

(C) which assures a stable adhesion; and (D) which may be reused after being removed.

To achieve the object above-mentioned, the light intercepting net in accordance with the present invention is formed by weaving or knitting yarns to produce fine meshes, and has one side to which a tackiness agent is applied.

The side of the net to which the tackiness agent is applied, is preferably smoothed. Further the yarns preferably have a suitable stretchability and elasticity.

Preferably, the net is formed by weaving or knitting glass fiber yarns and is coated with resin.

Colors or patterns may be painted or drawn on the net at one side or both sides thereof.

The tackiness agent is preferably hydrophilic for the reason to be discussed later.

It is noted that the term of "stretchability" used in the specification may be alternately expressed by rigidity or hardness. In other words, the stretchability refers to the nature of yarn that, when the yarn of 20 to 30 cm in length is held at one end thereof, the other end of the yarn does not completely hang down just below, but the yarn obliquely extends downward while assuming a loose circular arc configuration in its entirety. The term of "elasticity" refers to the nature of yarn that when the yarn is bent it automatically returns somewhat to its original straight configuration.

The following description will discuss the light intercepting net in accordance with the present invention, with the problems above-mentioned taken in consideration.

In conventional sheet-like light intercepting articles, rays of light are subjected to a kind of treatment such as partial transmission, diffused reflection, random refraction, color absorption or the like, according to the materials used. Accordingly, the conventional articles present a variety of defects inherent in the respective types.

According to the sight intercepting net of the present invention, the incident light may be reduced or adjusted in amount by adjusting the ratio in area of the mesh portions allowing light transmission to the net yarn portions preventing the light transmission. The effect of dazzlement by reflected light at the net yarn portions prevents the inside from being seen through from the outside. On the other hand, the light passing through the meshes in untreated natural light. This assures a fine see-through of the outside from the inside without a feeling of disorder. Thus, the light intercepting net of the present invention simultaneously assures the reduction in the amount of incident light and the prevention of the inside from being seen through, yet assuring a fine see-through of the outside from the inside, as set forth in the item (A) above-mentioned.

When attaching any of the conventional sheet-like light intercepting articles, it is required to use, as a pretreatment, an aqueous adhesive presenting a long drying time which allows the user to positionally shift the sheet as desired. Yet, creases or air bubbles are apt to be produced. Once produced, the creases or air bubbles should be removed by moving them, one by one, toward the sheet ends, or the sheet should be attached again after being removed. If the surface onto which the sheet is to be attached. is curved, such problem will be more serious. Sheet-like articles are primarily made to be used for plane surfaces. Therefore, it is a matter of course that the sheet-like articles do not get to fit curved surfaces. To forcibly fit the sheet-like articles to curved surfaces requires an advanced technique to strongly press the sheet-like articles, causing the same to be stretched. Such advanced technique can be hardly acquired by an amateur.

On the other hand, the light intercepting net of the present invention is formed by weaving or knitting yarns.

This prevents the net from being creased or containing air bubbles. Further, the yarn intersecting angles may vary and the mesh shapes may vary due to the flexibility of the yarns. This presents a so-called bias effect. Accordingly, when the net is merely pressed, the net may readily follow a curved surface and adhere thereto. Thus, the net of the present invention may be readily attached, in a short period of time, not only on a flat surface but also on a curved surface, as set forth in the item (B) above-mentioned. This advantage is particularly remarkable when the yarns constituting nets have a suitable stretchability and elasticity thereby giving the same natures to the resultant nets in there entirely.

A net generally presents raised portions at the yarn intersecting points thereof. Accordingly, when a normal net is attached to an object surface with a tackiness agent, such attachment results in point-contact of the net with the object surface. Accordingly, the ratio of the contact areas to the entire area is considerably reduced, failing to assure a stable adhesion. Primarily, a tackiness agent is a viscous fluid substance. If stress is continuously given, during a long period of time, to the surface to which a tackiness agent has been applied, and the overall adhesion is smaller than the overall stress, the tackiness agent may be separated from the surface due to the interfacial destruction or cohesive destruction of the tackiness agent. This phenomenon is particularly marked in a net adhering to the object surface in point-contact, in which the ratio of the contact areas to the entire area is very small.

According to the light intercepting net of the present invention, the surface thereof to which a tackiness agent is applied, preferably has no projections and is smoothed. This causes the net yarns in their entirety to adhere to the object surface in a linear contact manner. The contact ratio may therefore be considerably increased. This always assures adhesion which is sufficiently greater than the restoring force by the bias effect exhibited when the net is attached onto a curved surface. Thus, the light intercepting net of the present invention assures a stable adhesion, as set forth in the item (C) above-mentioned.

When tearing off an adhesive sheet-like article, the portion to be torn off is linear, requiring a great tearing force. Such great tearing force may cause the sheet-like article to be damaged. Thus, tearing off the adhesive sheet-like article is troublesome. Further, it is almost impossible to reuse such article thus torn off.

The light intercepting net of the present invention may be torn off at a plurality of points thereof. Accordingly, the net may be easily torn off, without damage to the net, with a very small force as compared with the case of the sheet-like article to be linearly torn off. Thus, the net of the present invention may be reused after being removed, as set forth in the item (D) above-mentioned.

The following description will discuss another aspect of the light intercepting net in accordance with the present invention, in which the net is formed by knitting or weaving glass fiber yarns and then coated with resin.

The glass fiber yarns are inorganic and have stretchability and elasticity greater than that of organic fibers. Accordingly, the glass fiber yarns are less broken and less creased, providing a good maneuverability. Further, the glass fibers are excellent in temperature and weather resisting properties as in resistance to tension, stretchability and the like. Accordingly, even though the glass fibers are attached onto a window surface which may receive strong rays of light and undergo great changes in temperature, the glass fibers are neither peeled off nor damaged due to the degradation stress thereof. The net formed by knitting or weaving the glass fiber yarns having such characteristics is coated with resin. Such coating not only prevents the glass fiber yarns from being destroyed by flexure, but also improves the bend of the light intercepting net. Further, such coating may decrease the difference in level between the projections at the yarn intersecting points and the adjacent concave portions, enabling the net surface to be smoothed.

The following description will discuss another aspect of the light intercepting net in accordance with the present invention, in which colors or patterns are painted or drawn on one side or both sides of the net.

If colors or patterns are painted or drawn on one side of a sheet-like light intercepting article, such colors or patterns are always projected to a certain degree onto the other side of the article due to its light transmission Accordingly, if different colors or different patterns are respectively painted or drawn on both sides of the sheet-like article, these colors or patterns interfere with each other, making no sense.

According to the light intercepting net of the present invention, the net yarns may not have light transmission properties. Thus, different colors or different patterns painted or drawn on both sides of the net do not interfere with each other, but are independent from each other. Accordingly, color having a high reflectance such as silver or gray may be painted on the outer side of the light intercepting net, while dark color such as black may be painted on the inner side thereof. This not only prevents the inside temperature from rising, but also prevents the inside from being seen through from the outside, yet assuring a fine see-through of the outside from the inside. Alternately, different patterns may be respectively printed on both sides of the net according to the desired atmosphere to be created. Such net may be used as a screen of the type to be attached, serving as an interior decoration.

The following description will discuss another aspect of the light intercepting net in accordance with the present invention, in which the tackiness agent used is hydrophilic.

When the light intercepting net using a hydrophilic tackiness agent is torn off from the surface to which the net has been attached, the tackiness agent remaining on the surface may be removed with a water-containing dust cloth or the like. This prevents the surface such as a pane from being injured in appearance.

BRIEF DESCRIPTION OF THE DRAWINGS

FIG. 2 and FIG. 3 are section views of the light intercepting net in FIG. 1; FIG. 2 showing the net before being pressed and FIG. 3 showing the net after being pressed;

DETAILED DESCRIPTION OF THE PREFERRED EMBODIMENTS

Figure 1:
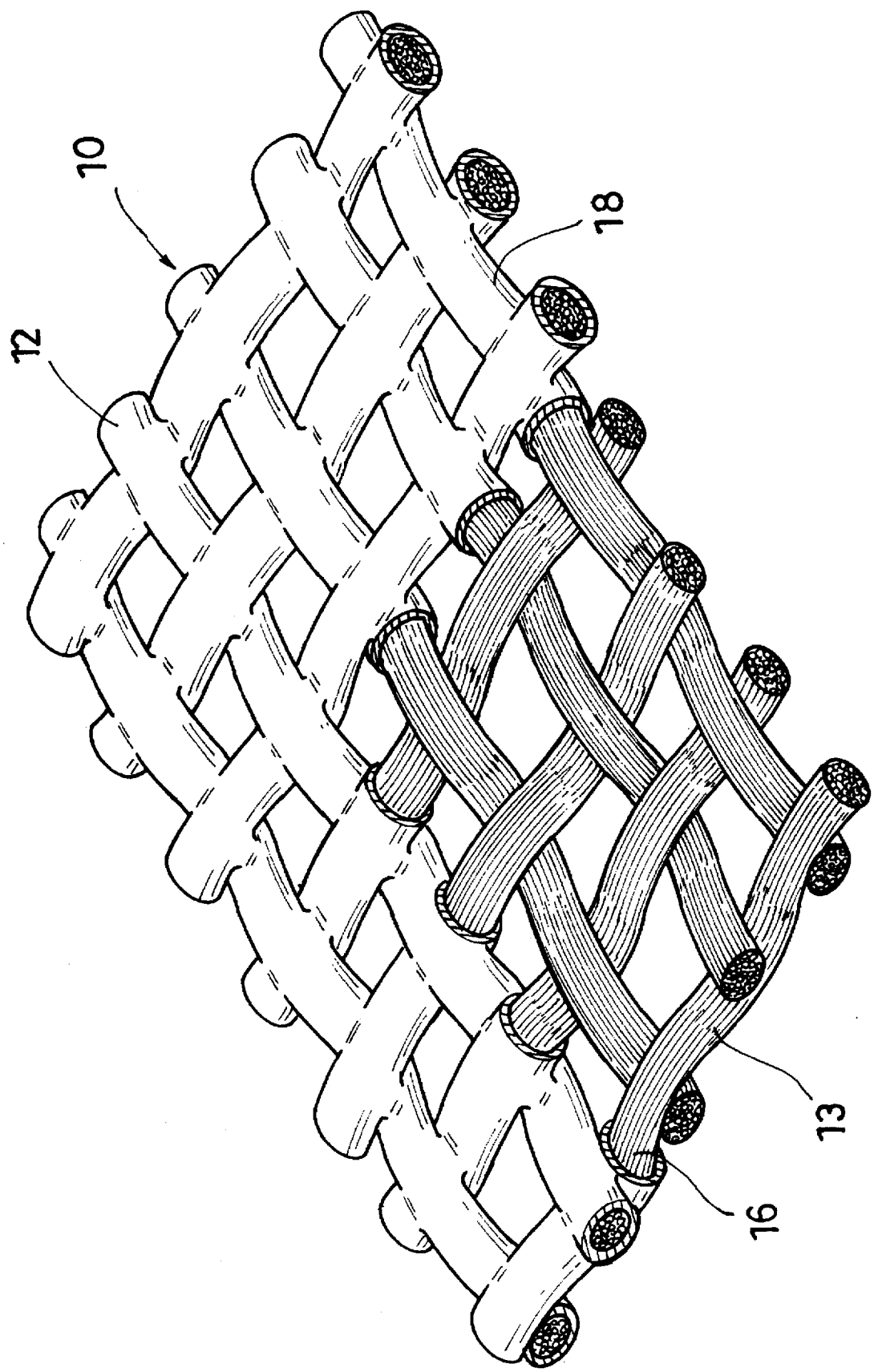
FIG. 1 is a perspective view, with portions broken away, of a light intercepting net in accordance with a first embodiment of the present invention.

The following description will discuss an embodiment of the present invention with reference to FIGS. 1 to 4.

A net 12 includes a basic fabric 13 in which 20 glass fiber yarns 16 are woven per 25 mm in each of the warp and weft directions, each glass fiber yarn 16 including 400 long glass fibers (each having a thickness of 6 µm) in which each two fibers are twisted. Particular restrictions are not imposed on the thickness of each glass fiber, but a glass fiber of 3 µm to 9 µm in thickness is preferable in view of stretchability and elasticity. The distance between adjacent glass fiber yarns 16 is suitably adjustable according to the application of the light intercepting net 10. Further, the mesh of the net 12 may be in the form of a rhomb or a hexagon, instead of a rectangular as shown in the embodiment.

The basic fabric 13 is coated, at the surface thereof, with about 35% per weight of vinyl chloride resin 18. This not only gives flexibility and improved bend to the net 12, but also prevents the glass fiber yarns 16 from being positionally shifted in the warp or weft direction to deform the net 12.

When the net 12 coated with the resin 18 is pressed by rolls (not shown), the resin 18 causes the net 12 to be changed in section from a wave shape as shown in FIG. 2 to a flat shape as shown in FIG. 3. If the net 12 as not pressed is attached to an object surface of glass G, the net 12 comes in contact with the glass G only at the yarn intersecting points 17 where the warp yarns 16a and the weft yarns 16b of the glass fiber yarns 16 intersect each other, as shown in FIG. 2. On the contrary, when the net 12 after being pressed is attached onto the glass G, the warp yarns 16a and the weft yarns 16b are linearly attached to the glass G, as shown in FIG. 3.

Figure 4:
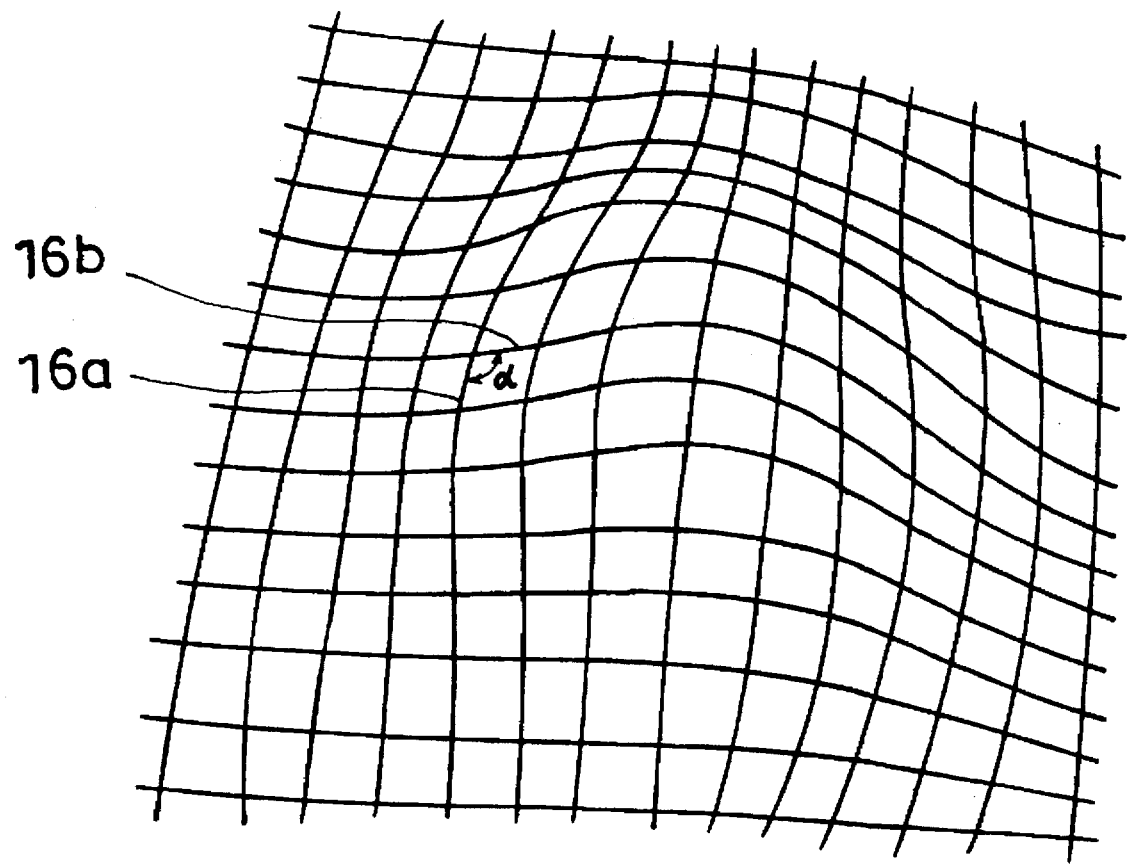
FIG. 4 is a schematic view illustrating the light intercepting net of FIG. 1 as attached to a curved surface.

In the embodiment, the net 12 is made by weaving the glass fiber yarns 16. Accordingly, when the net 12 is attached onto a curved surface, the intersecting angles α of the warp yarns 16a with respect to the weft yarns 16b may vary and the glass fiber yarns 16 forming the net 12 may be bent, as schematically shown in FIG. 4. This causes the shapes of the net meshes to be changed in three dimensions, enabling the net 12 to follow the curved surface.

As shown in FIG. 3, a hydrophilic tackiness agent 20 is applied onto one side 14 of the net 12 coated with the resin. In the case where the net 12 is removed, the hydrophilic tackiness agent 20 remaining on the surface may be easily washed and removed with water. Further, dirt, dust and the like accumulated on the surface of the tackiness agent in repeated attachments and removals may be washed and removed with water. This enables the deteriorated tack strength to be restored.

The tackiness agent 20 includes a variety of examples. Preferable in an example including an emulsion of an acrylic copolymer as a major portion and a small amount of an emulsion of the vinyl acetate type added thereto. It has been found that such tackiness agent produces a good result in view of stable tackiness, ease of attachment and removal, resistance to temperature, resistance to weather and the like. The tackiness agent 20 may be applied with the use of a roller, a spray or the like.

In the embodiment above-mentioned, the desired colors or patterns may be painted or drawn on one side or both sides of the coated net 12 according to any of various printing methods including a silk-screen printing. Even though patterns are clearly drawn on the net 12, natural rays of light may enter through the meshes and the outside may be seen into from the inside via the net meshes. When the net 12 is to be painted at both inner and outer sides thereof, silver-type color and black-type color may be respectively painted on the outer side and the inner side of the net 12. This enhances the reflectance of the sun rays to prevent the inside temperature from rising. These colors advantageously give an effect of dazzlement to make it difficult to see into the inside from the outside, yet assuring a fine see-through of the outside from the inside.

Figure 5:
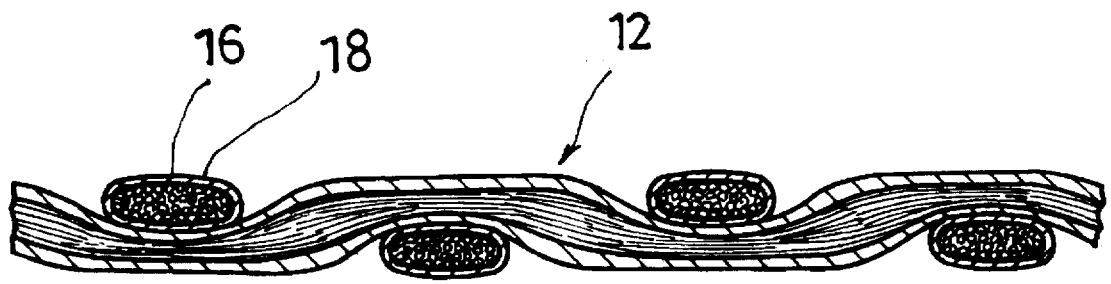
FIG. 5 and FIG. 6 are section views of a light intercepting net in accordance with second and third embodiments of the present invention, respectively.

In the embodiment above-mentioned, the basic fabric 13 is coated with the resin 18 after the basic fabric 13 has been formed by weaving the glass fiber yarns 16. According to a second embodiment of the present invention, the glass fiber yarns 16 may be first coated with the resin 18, and the net 12 may be formed by weaving the glass fiber yarns 16 thus coated, as shown in FIG. 5.

Figure 6:
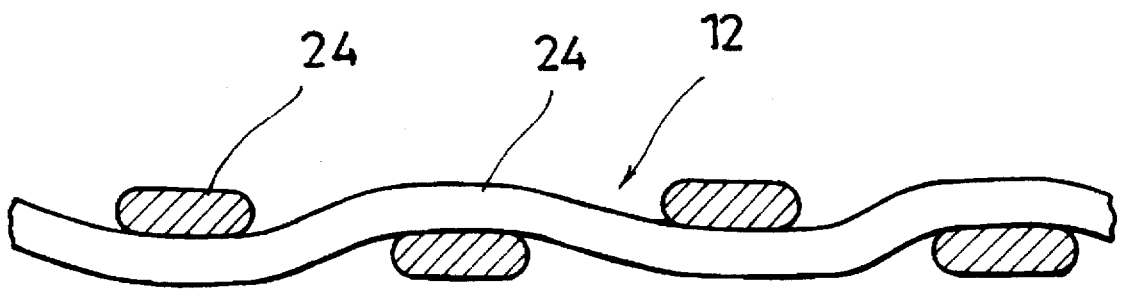

In the embodiments above-mentioned, the glass fiber yarns 16 in which a number of glass fibers have been bound, are used and these yarns 16 are coated with resin. According to a third embodiment of the present invention, flat mono-filaments 24 made of polyester resin may be used as shown in FIG. 6. In such case, the filaments 24 need not be coated with the resin 18. However, after the net 12 has been made by weaving the mono-filaments 24, the net 12 may be pressed with the use of rolls or by heat. This prevents the mono-filaments 24 from being positionally shifted in the warp and weft directions, causing the net 12 to be deformed.

According to the present invention, examples of the net-like basic fabric include, in addition to the woven net shown in the embodiments above-mentioned, a knitted net and a so-called orthogonal laminate cloth net formed by arranging organic fiber yarns or glass fiber yarns preferably having stretchability and elasticity in the weft and warp directions with the yarn intersecting points secured.

The light intercepting net in accordance with the present invention may be readily attached not only on a plane window surface but also on a curved window surface at the inside thereof in a short period of time. The net of the invention may not only reduce the amount of incident light entering from the outside to the inside, but also prevent the inside from being seen into from the outside, yet assuring a fine see-through of the outside from the inside. Further, the net assures a stable tackiness against rays of light and high & low temperatures, and may be repeatedly removed and attached to be reused, as necessary. Accordingly, the net of the present invention may be suitably used as lining of not only the windows of building but also the curved windows of motor vehicles which may encounter severe weather conditions.

Further, the net having one side or both sides on which a variety of colors or patterns are painted or drawn, may be used as a screen of the type to be attached, serving also as decorative means for both inside and outside thereof.

Further, when the net uses a hydrophilic tackiness agent, the agent remaining on the window surface after the net has been removed therefrom, may be removed with water. This enables the net to be repeatedly reused.

What is claimed is:

1. A light intercepting net comprising woven fibers, said woven fibers being a fine mesh in the form of yarns that are flattened for providing a surface for linear contact, said woven fibers having a ratio in area of meshes on one side of said net to another side of said net for permitting said net to reduce incident light and allow light to be reflected on a first surface of said net and natural light to pass through the first surface of said net to a second surface of said net, said net being coated with a resin, and a tackiness agent on a surface of said net coated with the resin for attaching said net to a desired surface by means of linear contact, the tackiness agent comprising an acrylic polymer and an emulsion of a vinyl acetate copolymer.

2. A light intercepting net comprising woven fibers, said woven fibers being a fine mesh in the form of yarns that are flattened for providing a surface for linear contact, said woven fibers having a ratio in area of meshes on one side of said net to another side of said net for permitting said net to reduce incident light and allow light to be reflected on a first surface of said net and natural light to pass through the first surface of said net to a second surface of said net, and a hydrophilic tackiness agent on a surface of said net for attaching said net to a desired surface by means of linear contact, the tackiness agent comprising an acrylic polymer and an emulsion of a vinyl acetate copolymer.

3. A light intercepting net comprising woven or knitted yarns having fine meshes permitting said net to reduce incident light and allow light to be reflected on a first side of said net and light to pass through the first side of said net to a second side of said net, a surface of said net being smoothed, and a tackiness agent being applied to said smoothed surface of said net, the tackiness agent comprising an acrylic polymer and an emulsion of a vinyl acetate copolymer.

* * * * *